Figure 3:
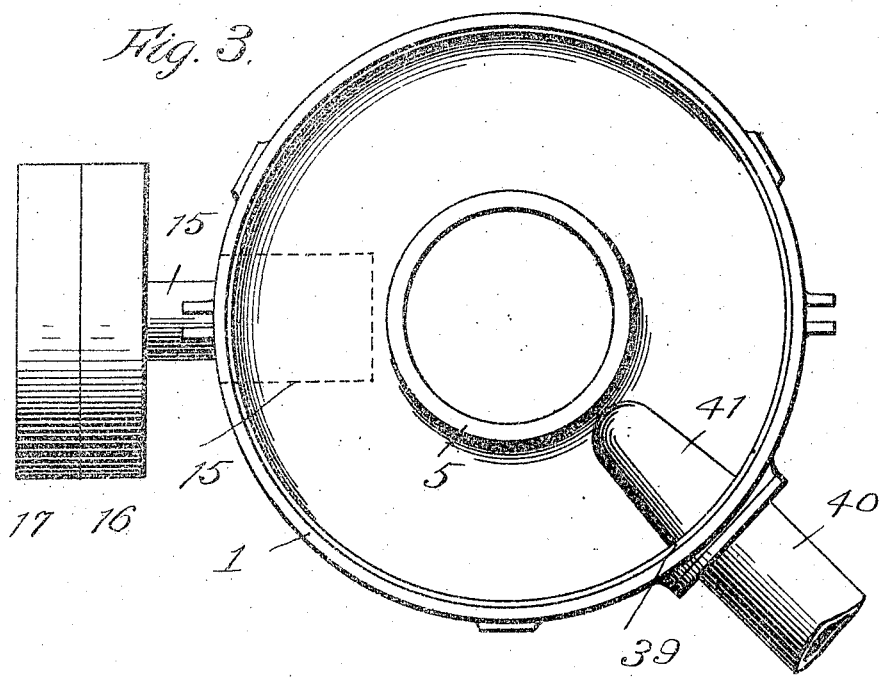

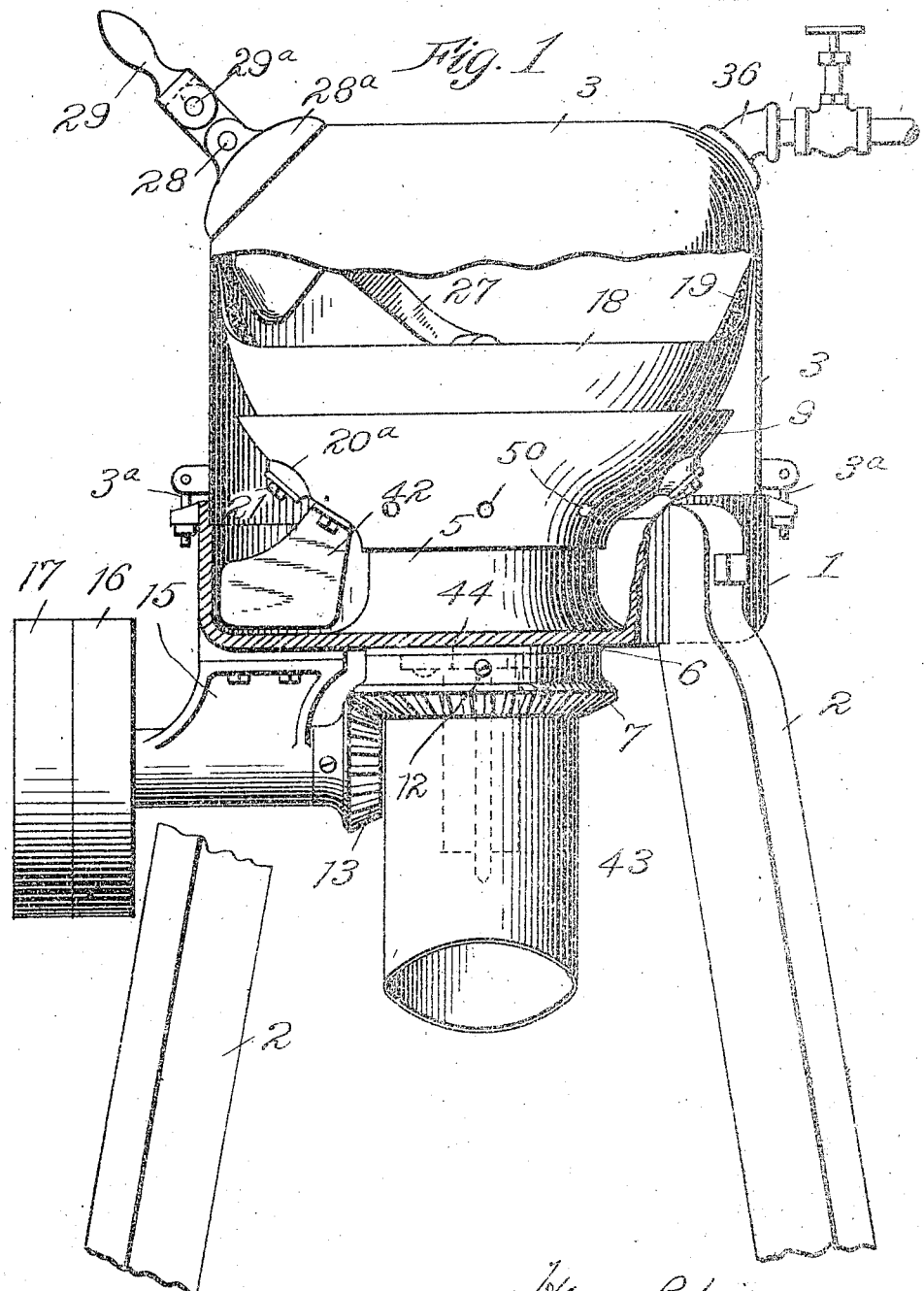

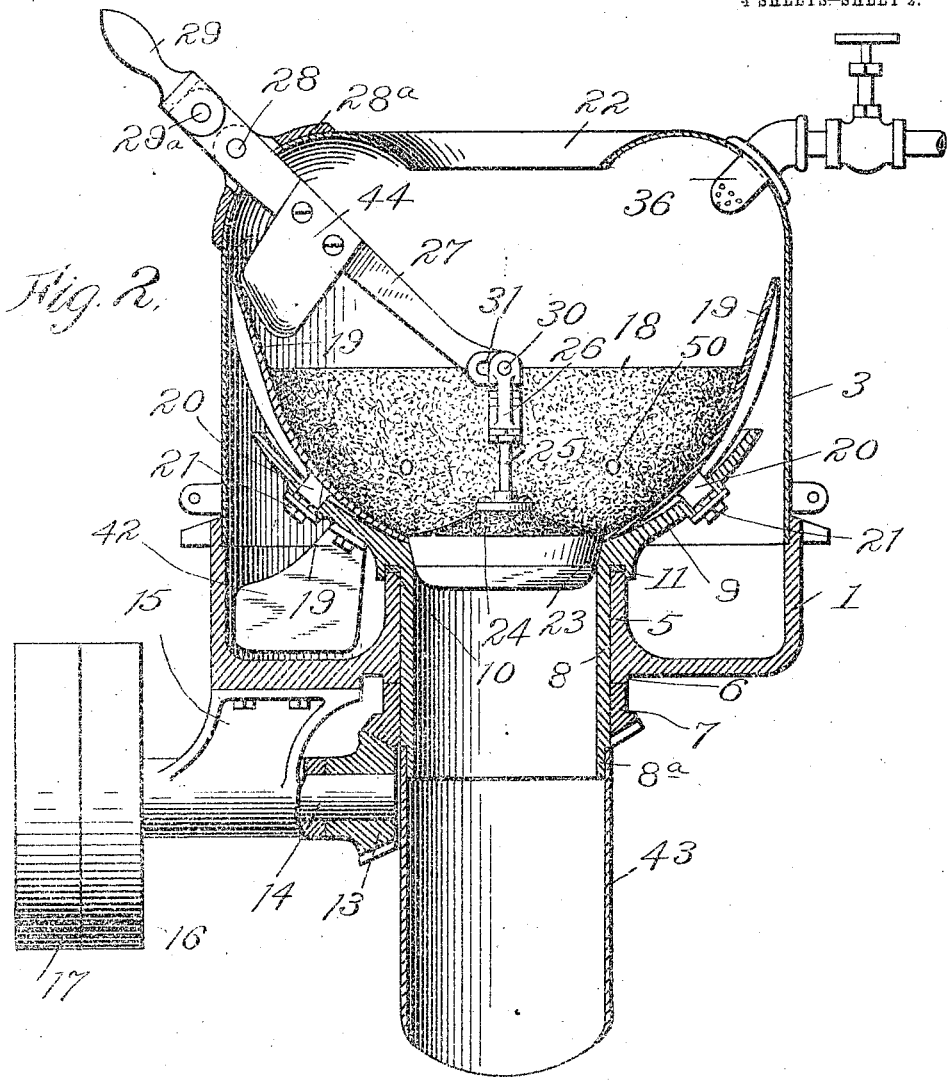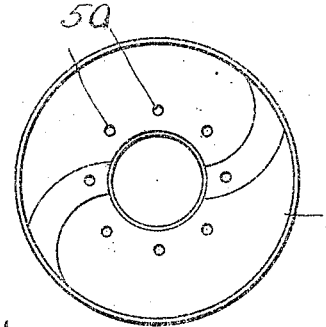

H. ROBINSON.
VEGETABLE PARING MACHINE.
APPLICATION FILED NOV. 3, 1910.

1,031,735.

Patented July 9, 1912.
4 SHEETS—SHEET 3.

Witnesses:

Henry Robinson
Inventor
By his Attorney

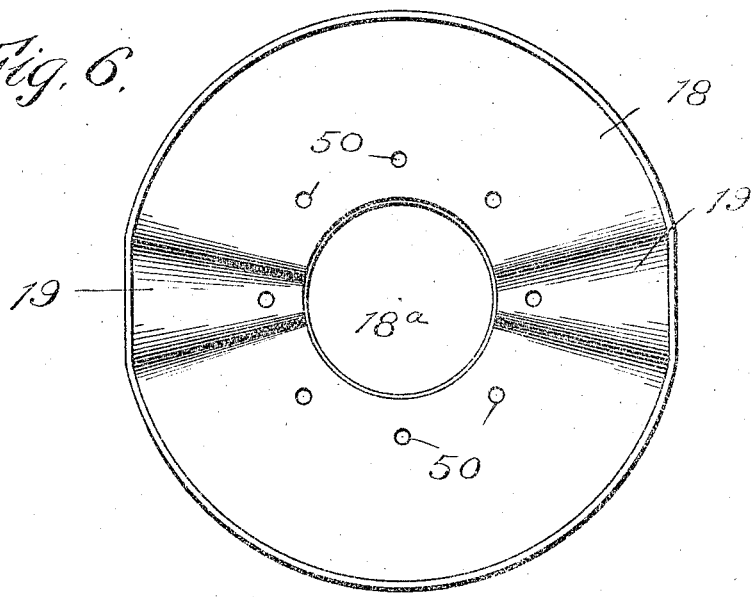
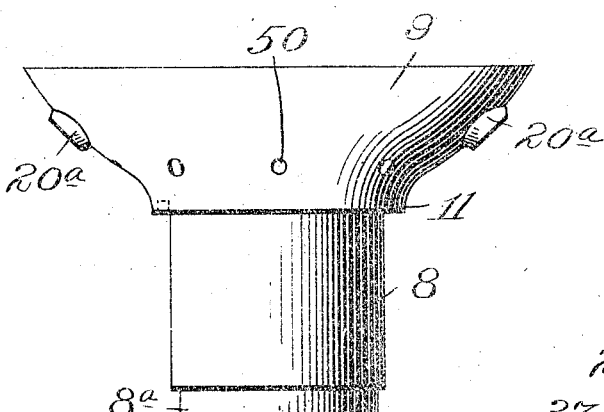
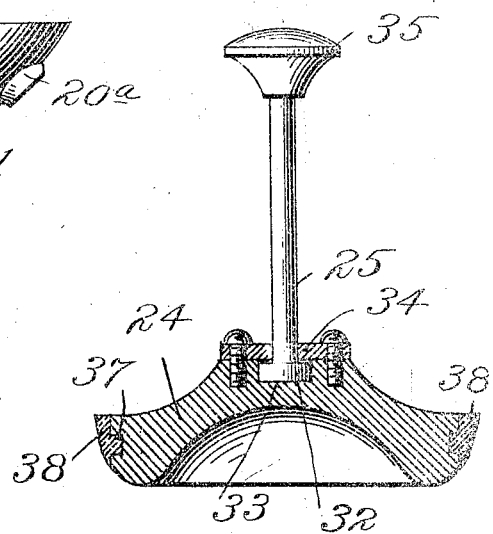

UNITED STATES PATENT OFFICE.

HENRY ROBINSON, OF SOUTH ORANGE, NEW JERSEY.

VEGETABLE-PARING MACHINE.

1,031,735. Specification of Letters Patent. Patented July 9, 1912.

Application filed November 3, 1910. Serial No. 590,594.

*To all whom it may concern:*

Be it known that I, HENRY ROBINSON, residing in South Orange, in the county of Essex and State of New Jersey, have invented a certain new and useful Improvement in Vegetable-Paring Machines, of which the following is a specification.

My present invention relates to a machine adapted to receive a deep mass of potatoes or similar vegetables, and to remove the skin of the same by causing a circulation in their mass, whereby each individual is brought in turn into contact with an appropriate abrading surface, whatever its constitution, in such a manner as completely to rub off the outer skin or peel with a minimum of waste.

My invention involves a thorough and radical departure from former types of vegetable peeling machines intended for the purpose named.

In vegetable peelers intended for operating upon deep masses it has been hitherto the practice to provide an exterior container, generally of cylindrical or conical form, at the bottom of which was placed a revoluble disk whose function was to support the vegetables, and, by its rotation, to impel the mass forward and produce a circulatory movement in the mass by virtue of the peculiar form of said disk; as, for instance, in my Letters Patent No. 942,932. Among the objections to this general type of machine may be mentioned the cost of providing two elements, respectively, for impelling and for containing or confining the vegetables and, what is more important, the bruising shock to which the vegetables are subjected during operation. This shock is due to the fact that each individual of the mass upon the rotating and impelling disk, as it moves outward under the influence of centrifugal force, while it is at first subjected to the action of a gradually more rapid rubbing action, is then suddenly brought into contact with the stationary side of the container and is bruised by the impact. Indeed, it often happens that the smaller potatoes or other like vegetables are actually squeezed and cut between the rotating disk and upright side walls.

In my present improved form of machine these disadvantages are obviated. I use a single element which unites within itself the functions of abrading, impelling, circulating and containing or confining the vegetables. This makes it possible to reduce the cost of the machine as a whole, and absolutely removes any possibility of bruise or shock to the vegetables due to the causes above mentioned.

My improvement also involves certain other advantages which will more fully appear in the course of the following description.

I have illustrated a preferred embodiment of my invention in the accompanying drawings wherein—

Figure 4:
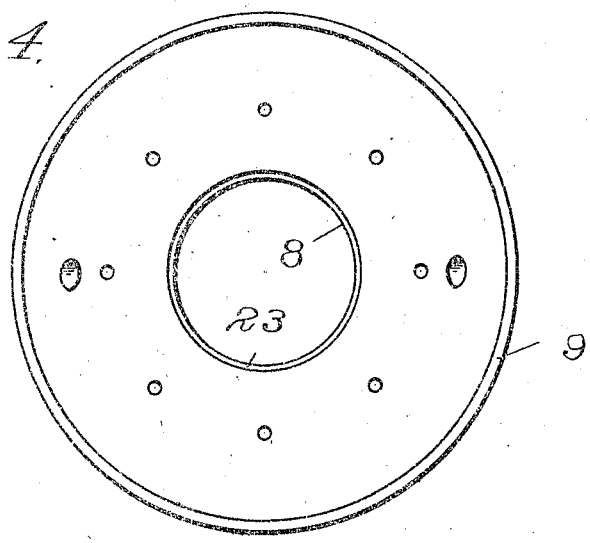

Figure 1 is an elevation of one form of my machine with portions of the outer shell broken away, Fig. 2 is a vertical section of the same, omitting the legs, Fig. 3 is a plan view of the preferred pan, Fig. 4 is a plan view of the metal support which preferably supports the combined abrader and container, Fig. 5 is a front elevation of the last named element, Fig. 6 is a plan view of the preferred form of rotary combined abrader and container, Fig. 7 is a vertical section of the discharging means showing a modified form thereof, and Fig. 8 shows a modified form of the humps or waves preferably used for promoting rapid circulation in the mass.

In Fig. 1, 1 is the pan of the machine to which the legs 2 (preferably three) are attached and to which may be fastened, for instance by swinging stay bolts 3ª in the manner shown, the cover 3 preferably of sheet metal. The pan is provided with a large central hollow boss 5, the main portion of which protrudes into the inside of the pan and a small portion of which also protrudes at the bottom of the pan, as may be seen at 6, so as to form an abutment for the gear wheel 7 which will be hereinafter referred to in detail. This boss as will be seen more clearly from Fig. 2, serves as a bearing for sleeve 8 which is located inside of boss 5 and which forms the downward extension of a supporting device 9 which is located inside of pan 1. Supporting device 9 rests upon boss 5 with a ring 10, preferably of a different metal suitable for bearings, interposed. The shoulder on the supporting device overlaps boss 5 with a lip 11 which prevents water and dirt discharged into pan 1 from getting into the bearing. The lower end of sleeve 8 protrudes a suitable distance beyond the lower end 6 of the boss and has attached to this end bevel gear wheel 7, for instance by means of set screw 12, so that this bevel gear wheel abuts against portion 6 of the boss whereby vertical movement of sleeve 8 is prevented. In mesh with bevel wheel 7 is bevel wheel 13 carried on a shaft 14 which is journaled in a bracket 15, screwed to the underside of pan 1. Shaft 14 may be driven for instance by pulley 16, a loose pulley 17 being also provided on this shaft. The supporting device 9 has substantially the form as shown and serves as a support for a bowl 18 which bears the abradant surface and which shall be called hereafter the abradant bowl.

It is not essential to my invention that the bowl or rotary container and its supporting device should be made separable as shown, this being merely preferred to facilitate construction.

The bowl 18 is essentially an abradant container or confiner of the vegetables rotative upon a substantially vertical axis and having a normally closed bottom and rising side walls formed to contain the vegetables and to return them from the periphery toward the rotative axis, so as to cause circulation of the individuals composing the mass. It is preferably formed so that a vertical section of the majority of its internal area is a line gradually approaching the vertical from near the center outward. Also it is preferably supplied with suitable humps to promote the circulation, substantially as hereinafter described. It should be adapted to hold the charge of vegetables so as to keep them normally out of contact with the outer guard or shell, intended to provide for return of any vegetables or water which may accidentally be thrown outward.

More or less of the lining of the container 18, and preferably the entire surface, is made suitably abradant, and for this purpose I prefer the surface indicated in the drawing, and described in my former Patent No. 942,932, made by applying granulated carborundum or the like to the surface. This is best accomplished by casting the abradant material directly into the surface of the container, which is usually made of cast iron. The abradant bowl is preferably provided with a plurality of humps or waves 19, and I have shown in the drawings two of such humps on diametrically opposite sides of the inside of the bowl, where they extend along the meridian line of the bowl or container from near the bottom center thereof upward and flare a suitable distance beyond the upper rim of the bowl as shown, whereby the humps gradually rise from the inner bowl surface near the bottom center and gradually increase in height as they run toward the upper rim of the bowl. The shape of these humps 19 is clearly shown in Fig. 2, which shows a vertical section through both humps 19 along their crest. The object of these humps or waves is similar to that explained in my aforesaid patent. The vegetables when struck by the humps when the bowl is rotated are tossed away from the humps and the surface of the bowl being abradant throughout, will peck the skin at the places at which the vegetable strikes the surface. While I prefer to extend the waves along the meridian line of the bowl, their course may be also spirally as shown for instance in Fig. 8, without departing from the spirit of my invention. The abradant bowl 18 is fastened to support 9 by means of lugs or bosses 20 cast integral with bowl 18, which extend part way through holes provided in bosses 20ª integral with bowl 9, in bowl 9 into which they are drawn by means of screws 21, as shown in Fig. 2. While I have shown only two humps as the preferred number, it is of course obvious that any suitable number of humps may be employed without departing from the spirit of my invention. The vegetables are placed into the abradant bowl 18 through an opening 22 provided in the top of guard casing or shell 3, the top of the casing flaring inwardly as shown in Fig. 2, so as to deflect any vegetables or water which might be accidentally thrown upwardly and outwardly when the bowl rotates.

The abradant bowl 18 has an opening 18ª at the bottom, which may be seen in the plan view of the bowl in Fig. 6, substantially of the same size as the inside of sleeve 8, the rim of the hole of bowl 18 and also the rim of the mouth of sleeve 8 being beveled as shown at 23 so as to form a seat for plug 24, which closes the opening to prevent vegetables from falling out. It may be mentioned that the surface of plug 24 facing the inside of bowl 18 may also be abradant as shown in Fig. 2. After the vegetables have been pared, plug 24 is withdrawn from its seat in the bowl, so that the vegetables are discharged from the bowl through sleeve 8. The manner in which plug 24 may be withdrawn, while the machine continues to rotate may vary. I have for instance shown two modifications. In Fig. 2 the upper end of central stem 25 of plug 24 which extends into the bowl is journaled in a swivel joint 26, which at its upper end is pivotally attached to a lever 27 pivoted at 28 in a bracket 28ª, suitably fastened to cover 3. The outer end of lever 27 projecting beyond its pivot point is formed into a handle 29, and I prefer to construct this handle as a so-called break-down handle which is pivoted at 29ª, so that when it is not needed it may be thrown inwardly (or to the right in Fig. 2), so as to be out of the way without moving lever 27, and when it is thrown to the left and in line with lever 27 this lever can be operated by pressing handle 29 downward. Break-down handles of this character are well known in the art, so that the detail description of it will be omitted. The pivot 30 by which swivel joint 26 is attached to lever 27 is located in an oblong hole 31 in lever 27, so that when this lever is thrown up, pivot pin 30 may slide in this hole so that plug 24 is lifted off its seat in a vertical direction. Stem 25 of plug 24 is also swiveled in the body of the plug as clearly shown in Fig. 7. As will be seen from this figure, stem 25 has a round foot 32, which is disposed in a central recess 33 of plug 24, which recess is covered by plate 34 with a central opening through which stem 25 protrudes. Instead of lifting plug 24 from its seat from the outside by the lever mechanism, just described, stem 25 may be provided with only a knob 35 of which the operator may take hold by reaching through opening 22 of casing 3.

The necessary water for the paring process is supplied through nozzle 36, which is attached to casing 3 near the top, which nozzle may be attached in any suitable manner to the water main.

In order to secure a tight seat for plug 24, its rim is grooved as shown at 37 in Fig. 7, to receive a ring 38 of yielding material, such as rubber for instance, so that the water cannot leak out through the vegetable discharge opening during the paring process. The water supplied through nozzle 36 is sprayed into the bowl and overflowing the rim and also passing through drain holes 50 provided in bowls 9 and 18, runs into pan 1, whence it is discharged through a lateral opening 39 provided near the bottom of pan 1, discharge pipe 40 being attached to pan 1 at this opening. The bottom of the pan is slightly depressed near this opening as shown at 41 in Fig. 3, to facilitate the drainage.

In order to constantly remove the dirt and peelings which are washed from the abradant bowl 18 into pan 1 and which are liable to collect in the annular space between boss 5 and the wall of the pan, I attach one or more wings 42 to the underside of supporting bowl 9, as shown in Fig. 1, which wing rotates with the bowl and thus constantly scavenges the annular space of the pan. Any suitable number of such wings 42 may be provided.

The sleeve 8 through the interior of which the peeled vegetables are discharged protrudes a short distance beyond gear wheel 7 as shown at 8ª into a discharge tube 43, which is fastened by means of a bracket 44 (shown in dotted lines in Fig. 1) to the underside of pan 1. The receptacle which is to receive the peeled vegetables may be placed underneath the discharge opening of this tube.

In order to still increase the tossing of the vegetables away from the periphery of abradant bowl 18, I may attach a deflecting wing 44ª to lever 27 against which the vegetables are thrown when the bowl rotates. By glancing off this wing, which might be preferably curved against the direction of rotation, the effect of deflecting the vegetables inwardly may be considerably increased.

In addition to those already named, the particular advantages of this machine are the simplicity in construction, the machine being composed of comparatively few parts and very few movable elements so that the wear on such movable elements is reduced to a minimum. Moreover the number of abradant members in the machine which are expensive to manufacture is reduced in this machine to only one, which can be easily removed from the machine and which has no other elements attached to it as is for instance the case in the machines of the type shown in my aforesaid patent where for instance the stationary pot has an abradant surface on the inside and has attached to it various other elements, such as for instance the door and the chute and the like on the outside. These elements in case the abradant surface has worn off or has been otherwise rendered useless, must be fitted to a new pot which involves considerable expense.

By discharging the vegetables through the center I avoid unnecessary spilling of the pared vegetables which might easily occur in machines which have a side discharge.

What I claim is:—

1. A vegetable peeler consisting of a receptacle rotative upon a substantially vertical axis and having a normally closed bottom and upwardly extending side walls provided with abradant surfaces, said side walls formed to contain the vegetables and to return the same from the periphery toward the axis of rotation of said receptacle, substantially as described.

2. A vegetable peeler consisting of a receptacle rotative upon a substantially vertical axis and having an opening at the bottom and upwardly extending side walls, provided with abradant surfaces, said side walls formed to contain the vegetables and to return the same from the periphery toward the axis of rotation of said receptacle, and a movable closing means for the opening in the bottom of said receptacle, substantially as described.

3. A vegetable peeler consisting of a receptacle rotative upon a substantially vertical axis and having a normally closed bottom and upwardly extending side walls provided with abradant surfaces and appropriately disposed humps or waves, said side walls formed to contain the vegetables and to return the same from the periphery toward the axis of rotation of said receptacle, substantialy as described.

4. A vegetable peeler consisting of a receptacle rotative upon a substantially vertical axis and having a normally closed bottom and side walls provided with abradant surfaces, said receptacle having a general interior shape whose vertical section is a line approaching the vertical from the center outward on a concave curve offering no sudden change of direction, substantially as described.

5. In a vegetable peeler, a rotary bowl having an abradant inner surface shaped so as to cause the vegetables as they rise along said surface under centrifugal action to return toward the center; in combination with a casing around said bowl rising above the same to serve as a guard to return toward the center any material accidentally projected beyond the edge of the bowl, substantially as described.

6. In a vegetable peeler, a revoluble bowl-shaped container having an abradant lining and a central discharge opening at the bottom, in combination with means surrounding said container adapted to return toward the center any material accidentally projected beyond the edge of the bowl, a removable closing means for said discharge opening and suitable means accessible from above said container for removing said closing means, substantially as described.

7. In a vegetable peeler, a pan having a central boss, an abradant revoluble member above said pan, a downwardly extending sleeve centrally attached beneath said revoluble member and journaled in said boss, said sleeve having a shoulder resting on said boss to support the revoluble member and said shoulder having a lip extending downwardly over the outer rim of said boss, and means for rotating said sleeve, substantially as described.

8. In a vegetable peeler, a pan having a central boss surrounding a vertical opening therein, a revoluble abradant member having a downwardly extending sleeve journaled in said boss and having a discharge opening communicating with said sleeve, a shoulder on said sleeve resting on the edge of said boss and having a lip extending downwardly over the outer rim of said boss, removable means for closing said discharge opening, and means for rotating said sleeve, substantially as described.

9. In a vegetable peeler, a rotary bowl having an abradant inner surface and a central opening in its bottom, a plug removably seated on said opening and a stem swiveled in said plug for lifting it from its seat while the bowl rotates, substantially as described.

10. In a vegetable peeler, a pan, a rotary abradant bowl above the same, said bowl being centrally journaled in an opening in said pan and having a central opening in its bottom, a plug removably seated in said opening, a stem swiveled in said plug for lifting it, and a hand lever pivotally attached to said stem and pivoted to the side of said machine and extending outside of the same, substantially as described.

11. In a vegetable peeler, an abradant bowl adapted to support and confine the vegetables and having a central discharge opening, means for closing said opening, a device swiveled to said closing means for removing it, and means for revolving said bowl, substantially as described.

12. In a vegetable peeler, a pan having a central hollow boss, a sleeve adapted to rotate in said boss, a bowl-shaped abradant member carried by said sleeve adapted to support and confine the vegetables and having an opening communicating with the top of said sleeve, closing means in said opening, and a casing carried by said pan and overhanging said bowl around a central inwardly sloping opening at the top thereof, substantially as described.

13. In a machine of the character described, a revoluble abradant member having a central opening, closing means in said opening, adapted to revolve with said member, a casing, and a device pivoted thereto and extending outside of the same for operating said closing means, substantially as described.

14. In a machine of the character described, a revoluble bowl-shaped abradant member having a central opening, closing means in said opening, a device for operating said closing means, and a deflector for the vegetables fixed to said operating device, substantially as described.

HENRY ROBINSON.

Witnesses:
H. S. MACKAYE,
KATHARINE MEAD.